(12) United States Patent
Imada et al.

(10) Patent No.: US 6,416,609 B1
(45) Date of Patent: Jul. 9, 2002

(54) PROCESS AND APPARATUS OF PRODUCING OPTICAL DISK AND PROCESS OF PRODUCING SUBSTRATE

(75) Inventors: Tetsuo Imada, Neyagawa; Shigeru Namiki, Kadoma; Kazuyuki Sawada, Hirakata; Toshiyuki Fujioka, Osaka; Takaaki Higashida, Kadoma; Mamoru Inoue, Hirakata, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/368,424

(22) Filed: Aug. 5, 1999

(30) Foreign Application Priority Data

Aug. 5, 1998 (JP) .......................................... 10-221398

(51) Int. Cl.$^7$ ............................................. B29D 17/00
(52) U.S. Cl. ...................................... 156/245; 264/1.33
(58) Field of Search ................................ 156/242, 245, 156/209, 219, 307.1, 307.3, 376; 264/1.1, 1.33, 1.36, 1.7, 1.9, 2.6, 2.7, 237, 348, 328.14, 328.16; 430/140; 428/64.7, 65.2

(56) References Cited

U.S. PATENT DOCUMENTS 5,115,041 A  *  5/1992   Tenney et al. ........... 525/332.1
5,686,026 A  *  11/1997  Ebina ....................... 264/1.33

FOREIGN PATENT DOCUMENTS

EP          0780216        6/1997
WO         WO97/35720     10/1997

OTHER PUBLICATIONS

Broek et al., Manufacture of Laservision Discs by a Photopolymerization Video Process, Jan. 1984, Journal of Radiation Curing, pp. 2–9.*

* cited by examiner

Primary Examiner—Michael W. Ball
Assistant Examiner—Gladys Piazza
(74) Attorney, Agent, or Firm—Wenderoth, Lind & Ponack, LLP

(57) ABSTRACT

There is provided a process of producing a laminate type optical disk comprising the steps of:

(1) molding a pair of substrates of a transparent resin at least one of which substrates has irregularities on its one main surface;

(2) forming a metal thin film on said one main surface having the irregularities, and then (3) laminating the pair of the substrates while the metal thin film is located inside and bonding the substrates by means of an adhesive which is supplied between the substrates, the process being characterized in that after the step (1), a waiting treatment is carried out in which the molded substrates are cooled to such a temperature that a difference between said temperature and a temperature of an atmosphere surrounding the substrates is not greater than 5° C. while keeping a moisture (or water) content of the substrates not larger than 0.1% by weight, and then the step (2) is carried out.

3 Claims, 7 Drawing Sheets

(a)

(b)

(a)

(b)

PROCESS AND APPARATUS OF PRODUCING OPTICAL DISK AND PROCESS OF PRODUCING SUBSTRATE

BACKGROUND OF THE INVENTION

1. Field of the Invention

The present invention relates to a process and an apparatus of producing an optical disk (or an optical medium), and particularly a laminate type optical disk, and also relates to a process of producing a substrate to be laminated for the production of the optical disk. For example, such an optical disk includes those for DVD (Digital Video Disk) or the like.

2. Related Art

A process has been known in which a single optical disk for DVD is produced by laminating a plurality (usually two) of substrates each having predetermined irregularities for a recording layer on its one main surface so that the single optical disk has a plurality of the recording layers. Such a process and an apparatus therefor are disclosed in for example WO97/35720, parts of which are incorporated herein by this reference provided that they are relevant to the present invention described hereinafter.

Concretely, the optical disk is produced by the following process comprising the steps of:

(1) preparing a pair of same or different two substrates each of which has been injection molded of a transparent resin so as to provide with fine irregularities on its one main surface and each of which has a metal (gold, aluminum or the like) thin film on said one main surface (usually, each substrate is of a circular form having a center hole);

(2) supporting the substrates while keeping a narrow gap between them so that the metal layers on the substrates are facing to each other;

(3) supplying an adhesive such as a UV curable adhesive into the gap and spreading it throughout the gap so that a laminate of the pair of the substrate and the adhesive between them is obtained; and (4) bonding the pair of the substrates together by curing the adhesive in order to join the substrates. For example, by irradiating UV on the laminate, the UV curable adhesive is cured.

Reading data (or information) from an optical disk or writing data into the optical disk is carried out by irradiating a laser beam having a predetermined wavelength onto the optical disk while the beam traversing the optical disk from its innermost or outermost periphery so that the beam passes through the transparent substrate and reaches a recording layer while the disk is being rotated at a high speed. Since a density of data which is to be recorded (or written in) or which has been recorded beforehand in the recording layer is extremely high, it is important that the laser beam is accurately focused onto a predetermined position of the optical disk. If flatness of the disk as a whole is not good, the laser beam cannot be focused onto the predetermined position of the optical disk so that data is likely to be incorrectly read or recorded.

Upon the production of the optical disk, it is therefore desirable that no deformation such as warpage or strain is observed in the optical disk as a final product, and also that occurrence of such deformation is suppressed after the production (i.e. during storing and/or using the optical disk), so that the produced optical disk has and keeps the improved flatness.

Considering the deformation which occurs in the optical disk, there comes one following possibility of a mechanism which causes the deformation:

The deformation of the optical disk is resulted from deformation with time of the substrate made of the transparent resin. Particularly, the substrate just after the molding which is in a dry condition at a considerably high temperature is likely to absorb moisture from its surrounding atmosphere, so that the substrate deforms as it absorbs the moisture.

Then, it has been proposed to subject the substrate to a treatment in which the molded substrate is left over an extended period to stabilize a moisture content of the substrate, and then subject to the metal film formation step as a subsequent step in which a metal thin film is deposited onto the substrate. The treatment may be also referred to as an "annealing treatment", and generally it is carried out over a period between few hours and 24 hours.

However, it is very ineffective to include the annealing treatment requiring the extended period in an integrated production line when mass production of the optical disk is intended. In order to carry out the annealing treatment, a large space is required for temporarily storing a large number of the molded substrates. If conditions of an atmosphere for the annealing treatment are changed due to some reason, an extent of the effect derived from the annealing treatment varies, which results in the various substrates which have different moisture contents. Further, it takes a considerably long time to produce the optical disk as a final product since starting the molding of the substrate.

In addition, there is further warpage (or warp) which appears with time after completing the production of the optical disk as well as further warpage which appears depending on application conditions of the optical disk. Even though the produced optical disk has passed product testing so that it has been proved to have a warpage within a predetermined specification, the warpage of the optical disk sometimes increases while it is repeatedly used or stored for an extended period, which may adversely affect recording the data into or reading the data from the optical disk. This would be because an internal stress or strain contained in the optical disk during its production is released with time or due to its application conditions so that the warpage additionally occurs.

SUMMARY OF THE INVENTION

Considering the above related art, it is therefore an object of the present invention to suppress the occurrence of the warpage upon the production of the optical disk and the warpage of the optical disk with time so that the optical disk of the laminate type is efficiently produced which has better flatness.

In the first aspect, the present invention provides a process of producing a laminate type optical disk comprising the steps of:

(1) molding a pair of substrates of a transparent resin at least one of which substrates has irregularities on its one main surface;

(2) forming a metal thin film on said one main surface having the irregularities, and then (3) laminating the pair of the substrates while the metal thin film is located inside and bonding the substrates by means of an adhesive which is supplied between the substrates, the process being characterized in that after the step (1), a waiting treatment is carried out in which the molded substrates are cooled to such a temperature that a difference between said temperature and a temperature of an atmosphere surrounding the substrates is not greater than 5° C. while keeping a moisture (or water) content of the substrates not larger than 0.1% by weight, and then the step (2) is carried out.

In the present invention, at least one of the pair of the substrates has the fine irregularities on one of its main surfaces. That is, only one substrate may have the irregularities on its main surface, but generally each of the substrates has the irregularities on its main surface. When the optical disk is of a read only memory (ROM) type, the irregularities correspond to pits of recorded data. When the optical disk is of a random access memory (RAM) type or a recordable (or write once) (R) type, the irregularities correspond to lands and grooves. In any type of the optical disks, irregularities which correspond to format information inherently required for the optical disk may be included in said one main surface of either or both of the substrates.

The metal thin film is a layer formed on said one main surface of the substrate having the irregularities which layer reflects light, and the film may be semi-permeable to light (i.e. translucent). For example, the metal thin film is formed by sputtering gold or aluminum. The metal thin film functions as a reflecting layer which reflects a laser beam irradiated onto the optical disk. When the both substrates have the irregularities, the metal thin film is formed on said one main surface of each of the substrates which has the irregularities.

In the case of the optical disk to which the laser beam is irradiated from one side thereof, the metal thin film is semitransparent which is formed on one of the substrates. In the case of the optical disk to which the laser beam is irradiated from both sides thereof, the metal thin film may be impermeable to light (i.e. opaque) which is formed on each of the substrates. When only one substrate includes the irregularities, it is sufficient that said one substrate has the metal thin film on its main surface, and the other substrate does not have to have a metal thin film.

For the read only memory type optical disk, the metal thin film in combination with the irregularities of the substrate reflects the irradiated laser beam depending on the data which was recorded beforehand. Therefore, the metal thin film may be referred to as a recording layer in the case of the read only memory type optical disk.

Also, as well known, for the random access memory type optical disk or the recordable type optical disk, using the irradiated laser beam, data to be recorded is recorded by means of the metal thin film (together with the irregularities on the substrate and a reversibly-changeable or irreversibly-changeable layer which is separately formed on the irregularities of the substrate). Further, using the irradiated laser beam, data previously recorded is read by means of the metal thin film (together with the irregularities on the substrate and the reversibly-changed or irreversibly-changed layer which is separately formed on the irregularities of the substrate). As described above, within the random access memory type optical disk or the recordable type optical disk, the irregularities, the reversibly-changeable or irreversibly-changeable layer and the metal thin film relate to functions of the optical disk of recording and reading the data, and the reversibly-changeable or irreversibly-changeable layer mainly contributes to the functions. Therefore, the reversibly-changeable or irreversibly-changeable layer may be referred to as a recording layer.

Thus, in the case of the random access memory type optical disk or the recordable type optical disk, the reversibly-changeable or irreversibly-changeable layer is formed on said one main surface of the substrate having the irregularities, and the metal thin film is formed on such a layer. Therefore, when the random access memory type optical disk or the recordable type optical disk is produced in the process of producing the optical disk according to the present invention, an additional step which forms the reversibly-changeable or irreversibly-changeable layer is carried out after the waiting treatment and before performing the step (2). In other words, the step (2) which forms the metal thin film comprises forming the reversibly-changeable or irreversibly-changeable layer on said one main surface of the substrate having the irregularities before the formation of the metal thin film, and then forming the metal thin film on the such layer. For the read only memory type optical disk, such additional step is of course unnecessary.

In the present specification, the term "recording layer" is used in the meaning as described above, and thus an element which corresponds to the meaning of the recording layer is different depending on the type of the optical disk. The present invention will be explained hereinafter in detail mainly with reference to the read only memory type optical disk. For the random access memory type optical disk or the recordable type optical disk, there is no substantial difference from the read only memory optical disk except that the reversibly-changeable or irreversibly-changeable layer is formed before forming the metal thin film. The formation of the reversibly-changeable or irreversibly-changeable layer can be carried out in the conventional manner.

In one embodiment, the waiting treatment of the present invention is carried out while keeping the moisture content of the substrates preferably not larger than 0.08% by weight and more preferably not larger than 0.05% by weight. The moisture content herein used is a weight basis percentage of water contained by the substrate relatively to the dried substrate, and it is so-called dry weight basis water content. In another embodiment, the waiting treatment of the present invention cools the molded substrates so that the difference between the substrates temperature and the temperature of the atmosphere surrounding the substrates (which is hereinafter sometimes referred to as merely "temperature difference of the substrate") is not greater than 5° C. and preferably not greater than 3° C. In a more preferable embodiment, the waiting treatment is so carried out that the temperature difference of the substrate is not greater than 5° C. while keeping the moisture content not larger than 0.05% by weight, and such treatment may be carried out for example by leaving the substrates removed from a molding machine for about 1 to 6 minutes to an atmosphere of which temperature is in the range between 20° C. and 35° C. and of which relative humidity is between 10% and 60%.

It is noted that the "atmosphere" of the present invention is intended to mean a space in which the substrates are subjected to the waiting treatment, and such a space is usually kept at a predetermined temperature and a predetermined humidity (for example at a temperature of 25° C. and a relative humidity of 30%). The humidity as described above may be measured in any proper manner, and for example by measuring a weight change of the substrate while it is positioned in the predetermined atmosphere.

In the second aspect, the present invention provides a process of producing an optical disk by laminating a first substrate formed by a first molding machine and a second substrate formed by a second molding machine, which process comprising the steps of:

(1) molding a pair of the first substrate and the second substrate of a transparent resin by means of the first molding machine and the second molding machine respectively, wherein at least one of the substrates has irregularities on its one main surface;

(2) forming a metal thin film on said one main surface having the irregularities, and then (3) laminating the pair of the substrates while the metal thin film is located inside and bonding the substrates by means of an adhesive which is supplied between the substrates, the process being characterized in that a difference in a mold temperature between the first molding machine and the second molding machine (which difference is hereinafter sometimes referred to as "mold temperature difference") is established in the range between 2° C. and 6° C. In the production process of the second aspect, it is preferable to carry out the waiting treatment according to the first aspect of the present invention.

The mold temperature used herein is intended to mean an arithmetic mean of temperatures of a pair of mold halves which together define a cavity (or an inner space) correspond to the substrate when a molten transparent resin is injected into the cavity of the mold which is constituted by the mold halves so as to produce the substrate. Usually, in the laminate type optical disk, one of the pair of the substrates has a rib (or a stack rib) and the other has no rib, and it is preferable that the mold temperature of the molding machine which forms the substrate having the rib is set higher.

In the third aspect, the present invention provides a process of producing a substrate for an optical disk by injection molding wherein a molten transparent resin is injected into a cavity of a mold, the process being characterized in that a difference in temperature between one and the other the pair of the mold halves (which difference is hereinafter sometimes referred to as "mold half temperature difference") which together constitute the cavity is in the range between 0° C. and 6° C. The substrate produced by this process is preferably used in the production process of the optical disk according to the first aspect or the second aspect of the present invention.

In the fourth aspect, the present invention provides an apparatus of producing an optical disk by laminating a pair of substrates using an adhesive which apparatus comprises (a) a substrate forming unit which molds the pair of the substrates of a transparent resin, at least one of which substrates has irregularities on its one main surface;

(b) a film forming unit which forms a metal thin film on said one main surface having the irregularities by means of a thin film forming means; and (c) a bonding unit which joins the pair of the substrates by means of the adhesive, the apparatus being characterized in that the substrates are passed from the substrate forming unit through the film forming unit to the bonding unit by means of a transporting means, and that the apparatus comprises a waiting treatment means which temporarily holds the substrates in an atmosphere for a predetermined period between the substrate forming unit and the film forming unit. The waiting treatment means performs the waiting treatment as described above.

In the present invention, the production process of the optical disk or the substrate (including forming the substrates, forming the metal thin film and bonding the substrates) can be carried out in the conventionally known manners as described below excepting the waiting treatment, the substrate formation under the specified mold temperature difference and the substrate formation under the specified mold half temperature difference.

DETAILED DESCRIPTION OF THE INVENTION

Figure 1:
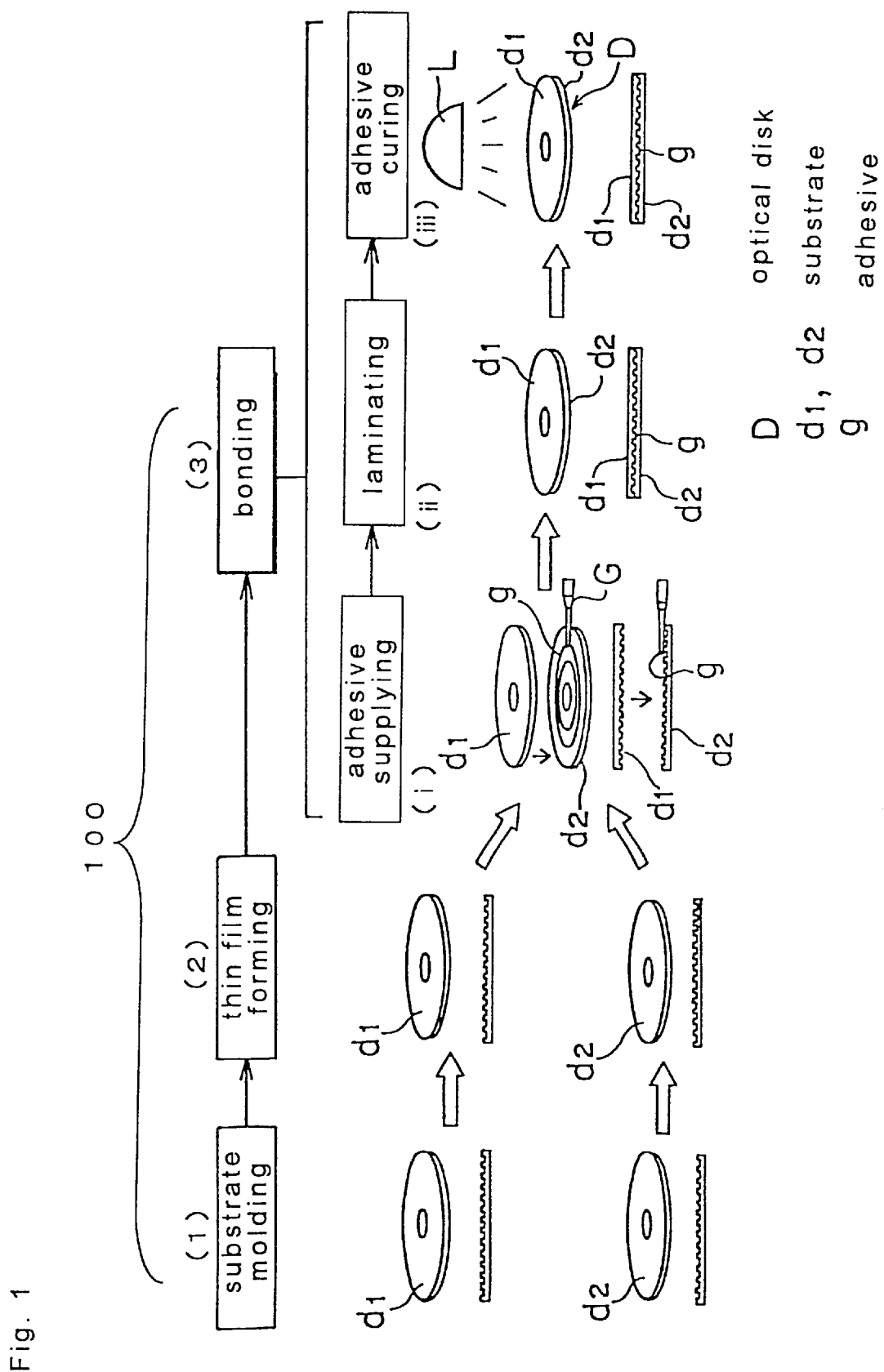
FIG. 1 shows a schematic step scheme of the process for the production of the optical disk according to the present invention.

The present invention will be hereinafter described in detail with reference to the members which constitutes the optical disk and the production process of the optical disk, and the substrate which forms the optical disk and the production process of the substrate.

As to Optical Disk

The optical disk of the present invention may be any type of the optical disk provided that it is produced by laminating and bonding a plurality of the substrates. Usually, two substrates are laminated. The optical disk produced by the present invention particularly includes, in addition to those for DVD, other optical disks such as CD (Compact Disk), PD (Phase change Disk), LD (Laser Disk) or the like. Such laminate type optical disk may comprise a single recording layer, but generally comprises two recording layers.

As to Substrate

The substrate which is used for the optical disk according to the present invention is produced with using materials of a synthetic resin, a metal thin film and so on depending on the application conditions and the like of the optical disk. For the optical disk for DVD, the substrate is formed of a transparent resin such as a polycarbonate resin, and its one main surface has the predetermined fine irregularities which correspond to recorded data or lands and grooves. At least one of the pair of the substrates includes the one main surface having the irregularities.

The metal thin film is formed on said one main surface having the irregularities of the substrate as described above. Such a metal thin film is a metal layer which reflects the laser beam irradiated onto the optical disk, and made of a metal such as gold, aluminum and silicon. It may be formed by sputtering. The formed metal thin film is opaque or semi-transparent to light, and optionally a protective layer (for example a layer of zinc sulfide) may be formed on the metal thin film.

It is noted that for the read only memory optical disk, the substrate as described above is used, but that for the random access memory type optical disk or the recordable type optical disk, the layer of the reversibly-changeable material (such as GeSbTe) or irreversibly-changeable material (such as TePdO) is formed as the recording layer on said one main surface having the irregularities in the conventional manner before the formation of the metal thin film.

Such two substrates are laminated and bonded. Usually, a side of the substrate on which side the metal thin film is formed is to be a surface to be laminated. Upon the lamination, each of the two substrates may have the irregularities, the metal thin film and optionally the layer of the reversibly-changeable material or irreversibly-changeable material as described above. Each of the substrates may have the same structure and made of the same material, or may have a different structure or made of a different material.

In the case of the ROM type optical disk, at least the irregularity structure, and thus the structure of the recording layer of one substrate is different from that of the other substrate. In the case of the other type optical disks, the both substrates may be of the same structures at least as to the irregularity structure, and thus the structure of the recording layer except portions of the substrates relating to the format data. In other embodiment, one substrate includes the irregularities and the metal thin film, and the other substrate is merely a disk shaped plate made of a resin having a flat main surface on each side thereof and includes neither the irregularities nor the metal thin film. The protective film may be absent, or at least one substrate may have the protective film.

The shape of the substrate is thin circular form having a small center opening when the substrate is used for the usual optical disk. Further, one of the two substrates generally has a rib around the opening. Depending on the conditions under which the optical disk is used, the substrate may be of a different shape rather than the circular shape, and the shape of the substrates may be changed after they have been bonded.

When the substrates are laminated so as to bond them, the metal thin film(s) is located inside the laminate. That is, substrates are positioned so that the metal thin film(s) are located closer to the surface to be laminated.

As to Substrate Molding Step

Basically, any molding apparatus and molding process which are as used for the production of the substrates for the optical disk may be used for the substrate molding step in the present invention. As the molding process and the molding apparatus, an injection molding process and an injection molding apparatus are used. With the injection molding apparatus, the mold is constituted of a pair of mold halves which form an upper side and a lower side of the mold respectively or a right side and a left side of the mold respectively. The mold halves define a cavity within the mold, and the shape of the cavity corresponds to the outer profile of the substrate. Since the substrate includes the pits (for the case of the ROM type) or the lands and the grooves (for the case of RAM or R type) which form the fine irregularities for data recording, one side of the cavity has a shape having the fine irregularities which correspond to the fine irregularities of the substrate.

Upon the injection molding, a molten resin at an elevated temperature is supplied into the cavity of the mold under a high pressure. Molding conditions such as an injection pressure, an injection temperature and so on may be the same as those for the injection molding of the substrate production for the conventional optical disk. In order that the supplied resin flows smoothly, the mold is heated to a predetermined temperature. As described below, by adjusting heating temperature of the mold, shape accuracy and an extent of warpage (or warp) of the molded substrate can be controlled.

It has been found that when a temperature of one mold half which forms a front side of the substrate is different from that of the other mold half which forms a back side of the substrate by not less than 6° C. and not greater than 10° C. (and preferably in the range between 7° C. and 9° C.) and the substrate is molded under such a temperature condition, the optical disk finally produced has less warpage. Further, it has been found that when the mold half temperature difference as above is set not less than 0° C. and less than 6° C. (and preferably in the range between 2° C. and 5° C.), the warpage of the optical disk just after the production thereof is increased a little compared with the mold half temperature difference in the range between 6° C. and 10° C., but the warpage increase with time is suppressed.

According to the process of the present invention, the optical disk is produced by laminating and bonding the pair of the substrates. It is further found it preferable that each of the two substrates is produced separately in a different injection molding machine wherein a mold temperature of one molding machine is different from that of the other molding machine. In this preferable embodiment, the mold temperature difference is preferably in the range between 2° C. and 6° C. and more preferably in the range between 3° C. to 4° C.

In the process of the present invention in which one substrate of the pair is formed by the first molding machine and the other substrate of the pair is formed by the second molding machine, by making the mold temperature of the first molding machine different from that of the second molding machine, the warpage change with time of the optical disk can be controlled. In one concrete example, the mold temperature of one molding machine which forms the substrate having the semitransparent metal thin film (or the rib as to its shape) is higher than that of the other molding machine which forms the other substrate (without a rib) by temperature difference in the range between 2° C. and 6° C., whereby warpage increase of the optical disk with time is suppressed at a small extent. For example, a tilt angle change Δt is suppressed as low as within ±0.3°.

As to Metal Thin Film Forming Step

Using a thin film forming means, the metal thin film is formed on the substrate as in the case of the conventional optical disk. The metal thin film is formed directly on one main surface of the substrate having the irregularities or on the reversibly changeable or the irreversibly changeable layer on the irregularities. The material for the metal thin film may be gold, aluminum, and any other material used for the conventional optical disk. As the thin film forming means, the vacuum deposition, CVD (the Chemical Vapor Deposition), PVD (the Physical Vapor Deposition) and so on may be used.

As to Waiting Treatment

As described above, before forming the metal thin film, the waiting treatment is carried out and then the metal thin film is formed. Usually, after completing the waiting treatment of which waiting period is appropriately fixed, for example in the range between one minute and six minutes, the metal thin film forming step is carried out. The waiting period generally starts from a point when the substrate leaves the mold and ends at a point when the metal thin film formation starts. Therefore, a period required for the substrate to be transported from the substrate molding step to the metal thin film molding step is included in the waiting period, during which the waiting treatment is carried out.

In order to suppress the warpage of the optical disk as a final product, it is preferable that the substrate is so cooled that a temperature difference between the substrate temperature and the temperature of the atmosphere surrounding the substrate of the waiting treatment is not larger than 5° C. It is preferable that at least two minutes are used to cool the substrate in the atmosphere. The temperature decrease of the substrate as described may be observed any suitable manner and for example measured by using an infrared thermometer.

The temperature of the substrate just after molding depends on the material to be molded, but it is generally as high as about 70 to 100° C., and such temperature of the substrate is reduced by the waiting treatment in the atmosphere. The atmosphere in which the waiting treatment is carried out is outside of the molding machine and usually in the room in which the molding machine is positioned. In order to cool the substrate, it is sufficient merely to subject the substrate to the temperature of the room (namely, to leave the substrate in the room). Alternatively, the substrate may be forced to be cooled by blowing cold gas (such as air) or made contact with a cold object. It is to be noted that occurrence of thermal stress or thermal strain because of rapid cooling of the substrate should be avoided. The waiting treatment is carried out as described above, and the atmosphere for the waiting treatment is usually at around a normal temperature (about 20° C. to 25° C.).

Upon the waiting treatment, the moisture content of the substrate is not larger than 0.1% by weight (based on the dry substrate without moisture), preferably not larger than 0.8% by weight and more preferably not larger than 0.5% by weight. By adjusting the moisture of the atmosphere from the substrate molding step to the metal thin film forming step, increase of the moisture content is suppressed. For example, the transporting path between these steps may be formed to be a closed space and the moisture content of the space may be controlled. The less the moisture content of the substrate is, the less the warp deformation of the optical disk is.

When the substrate is cooled to the same temperature of the atmosphere or to a temperature which is little higher than the atmosphere while keeping its moisture content as described above, the warp deformation because of the thermal deformation or the thermal strain of the substrate is suppressed. If the metal thin film is formed while the substrate temperature is too high compared with that of the atmosphere or the moisture content is too large, the tilt angle of the produced optical disk varies widely. Generally, the waiting treatment is carried out in the atmosphere of which temperature is in the range between 20° C. and 35° C. and of which relative humidity is in the range between 10% and 60%, and using this atmosphere, the waiting period between one minute and six minutes achieves the temperature and the moisture content of the substrate as specified above.

In other words, the waiting period in the present invention is so set that the molded substrate is cooled to the above specified temperature while keeping its moisture content below the above specified amount. If the period between the substrate molding step and the metal thin film forming step is too short, the metal thin film is formed on the substrate which has not yet been cooled enough, so that deformation of the substrate is likely to be occur upon the metal thin film formation. Particular, when heat is supplied upon the film formation, the thermal deformation of the substrate is likely to occur so that the warpage is likely to occur in the produced optical disk.

When the waiting period is too long, for example longer than 40 minutes, the moisture content of the substrate may vary widely so that warpage deformation is likely to occur. If the waiting period between a few hours and 24 hours is employed as in the conventional annealing treatment, the moisture content becomes constant so that variation of the warp deformation due to the absorption of the moisture is suppressed, but productivity of the optical disk becomes worse. Further, the warp deformation may vary because of variation of the temperature and/or humidity of the waiting treatment atmosphere over the extended period.

In the present invention, in order to set a certain waiting period beforehand, a period during which the substrate is transported from the substrate molding step to the metal thin film forming step is adjusted. For example, a length or a speed of a conveyer means which transports the substrates is changed so as to change the waiting period. Alternatively, the substrate molding step and the metal thin film forming step are successively carried out at certain intervals, and a temporary holding means may be provided between those steps which means carries out the waiting treatment while the formed substrates are temporarily held beside the conveyer.

As to Temporary Holding Means

In a concrete embodiment, as the temporary substrate holding means, a device is employed which takes the substrates on the way between the substrate molding step and the metal thin film forming step out of the conveyer transporting the substrates and which stacks or arranges them in a separate place, and which puts the substrates back on the conveyer after a predetermined period which transports them to the metal thin film forming step.

By providing such a temporary holding means as described above, there is no need to change the length or the speed of the transporting conveyer so as to change the waiting period. Even though the waiting period is to be long, the transporting conveyer need not to be long or no large space is required.

As to Bonding Step

After the metal thin film is formed, the pair substrates are bonded together using the adhesive. For bonding, the process steps and the apparatus are used as conventionally used for the production of the optical disk.

As the adhesive, various kinds of light curable adhesives may be used depending on the material for the substrate to be bonded and application conditions of the optical disk (such as an application place (for example in cars), an application temperature, an application purpose (for example for audio)). Particularly, a UV curable transparent adhesive is preferably used for the optical disk for DVD. It is also possible to use an adhesive which cures by other light beam having a wavelength rather than UV (ultraviolet ray). Providing the adhesive on one or both of the pair of the substrates by means of the conventional application or coating means, the substrates are laminated followed by curing by for example the UV. It is noted that bonding is carried out such that the main surface having the metal thin film or the irregularities is located inside the laminate and that when the both of the substrates have the metal thin film and the irregularities, both of the metal thin films or the both irregularities are located inside the laminate (namely, facing to each other).

For preferable bonding, the following process may be employed:

Supporting the pair of substrates while they are facing to each other with a relatively narrow gap between them, an adhesive injection nozzle is inserted into the gap and the adhesive is injected while the substrates are rotated around an vertical centered axis, whereby the adhesive is supplied in a ring form between the substrates. Then, the gap is narrowed while rotating the substrates, so that the adhesive is extended radially and the thin adhesive layer completely fills the gap to obtain the laminate.

In order to cure the adhesive, a light irradiation lamp is positioned above the laminate which is placed on a horizontal platform, and irradiating a light beam passing it through the transparent substrate material at the top side and the semitransparent metal thin film if present so as to make the beam reach the adhesive, whereby the adhesive is cured. The bonding process as described above is described in International Publication WO97/35720 which was referred to before.

As to Other Steps

By bonding the substrates, the production of the optical disk is completed according to the present invention. It is optionally possible to carry out a testing step to inspect the produced optical disk as to its shape and size, or check whether required data information is recorded therein. Further, a printing step may be carried out which print characters, designs and the like on the surface of the optical disk provided that they do not adversely affect reading information date of the optical disk.

Embodiments of the Invention

As shown for example in FIG. 1, the optical disk is produced according to the present invention using an integrated production line 100 comprising the molding step (1), the film formation step (2) and the bonding step (3). In the shown embodiment, the ROM type optical disk is produced.

In the molding step (1), using the injection molding machine, the substrates d1 and d2 are formed each of which has a flat doughnut shape (namely, a circular having a small center opening). There are formed pits on one main surface of each substrate which correspond to the fine irregularities. One of the substrates d1 and d2 may be a flat substrate without irregularities.

In the film forming step (2), the metal thin film is formed on each of the substrates d1 and d2 using a thin film forming device such as a vacuum deposition device. For example, a gold thin film may be formed on the substrate d1 and an aluminum thin film may be formed on the substrate d2. In the case of one side recording optical disk, no metal thin film may be formed on one of the substrates.

In the bonding step (3), the substrates d1 and d2 are bonded together using the adhesive (g) so as to produce the optical disk (D). This step (3) comprises an adhesive supplying sub-step (i), a laminating sub-step (ii) and an adhesive curing sub-step (iii).

In the adhesive supplying sub-step (i), a pair of the substrates d1 and d2 are supported horizontally while main surfaces each having the metal fine film on the irregularities are facing to each other. While rotating the substrates d1 and d2, the adhesive (g) is ejected from a nozzle of an adhesive dispenser (G), so that the adhesive is provided in a ring form. Upon this provision, when the gap between the substrates d1 and d2 is so narrowed that the adhesive contacts both of the substrates, the adhesive is appropriately located so that inclusion of bubbles in or non-uniform coating of the adhesive is prevented in the next laminating sub-step (ii).

In laminating sub-step (ii), the substrates d1 and d2 approach to each other while they are rotated horizontally, so that the adhesive is thin spread completely between them and the substrates tightly are adhered to each other so as to obtain a laminate of the substrates. In the adhesive curing sub-step (iii), using a U.V. lamp, the U.V. rays are irradiated from one side of the laminated substrates and the U.V. rays are passed through the transparent substrate d1 and the adhesive (g) is cured. When curing is completed, the substrates are bonded together to obtain the optical disk.

As to Production Apparatus

Figure 2:
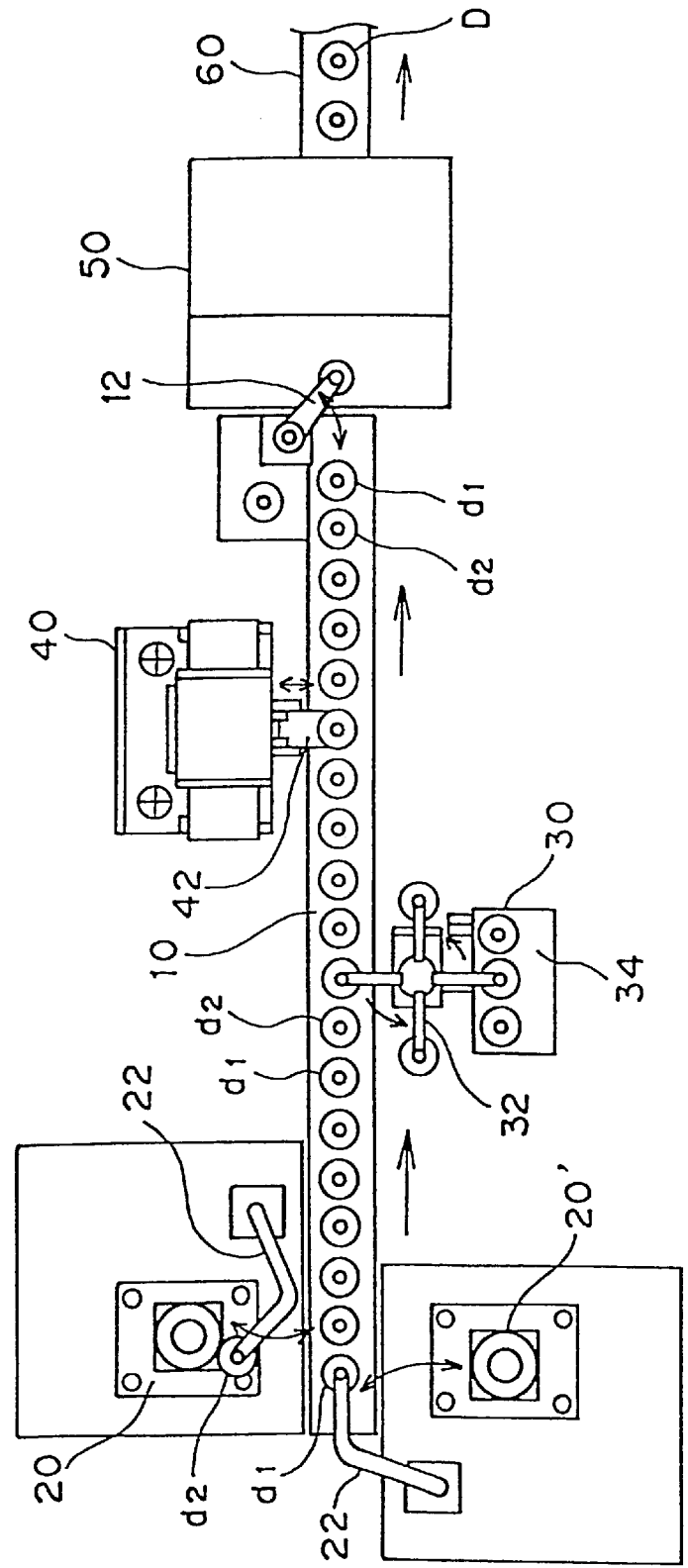
FIG. 2 shows a schematic top view of an integrated production line apparatus for the optical disk according to the present invention.

FIG. 2 schematically shows a top view of a production apparatus which is used to carry out the production process of the optical disk according to the present invention. The apparatus comprises molding units 20 and 20', a temporarily substrate holding means 30, a metal film forming unit 40 and a bonding unit 50, which are positioned along the conveyer 10 which moves toward the right hand side of FIG. 2.

The molding units 20 and 20', are provided either side of the conveyer 10 upstream thereof, respectively. The molding units 20 and 20', are constituted of two injection molding machines and produce the substrates d1 and the substrates d2 successively. The molded substrates d1 and d2 are provided alternately on the conveyer 10 by means of rotating arms 22. The substrates d1 and d2 are transported by the conveyer while arranged alternately on the conveyer.

Using a rotatable cross-arms 32, the temporarily substrate holding means 30 remove the substrates d1 and d2 from the conveyer 10 and put them on a waiting platform 34 beside the conveyer 10. The substrates d1 and d2 are stacked one on the other or arranged side by side on the platform. After the substrates are temporarily held at the platform for a predetermined period, the substrates are returned onto the conveyer 10 again by means of the rotatable cross-arms 32. By adjusting the period over which the substrates are temporarily held, the waiting period of the waiting treatment may be controlled.

The metal film forming unit 40 takes in the substrates d1 and d2 one by one using a reciprocating arm 42, deposits a corresponding metal thin film onto the substrate which corresponds to the substrate d1 or d2, and then return the substrates to the conveyer 10. When gold and aluminum are used for the metal thin films, the unit 40 is provided with thin film forming devices for gold and aluminum. After the metal thin film formation is completed, the substrates d1 and d2 which have been transported downstream end are passed into the bonding unit 50 by means of a rotatable arm 12.

At the bonding unit 50, the substrates d1 and d2 are supported while facing to each other, the adhesive (g) is supplied, the substrates d1 and d2 are laminated, the adhesive is spread, and the adhesive is cured by means of the U.V. lamp (L), so that the optical disk (D) is produced.

The produced optical disk (D) is positioned on a conveyer 60 and collected.

As to Static Electricity Discharging Device

In the production apparatus as described above, in order to prevent static electricity accumulation in the substrates d1 and d2, a device which removes the static electricity may be provided. Particularly, it is desirable that moisture amounts absorbed by the substrates d1 and d2 are suppressed along the path from the molding step to the thin film forming step through the waiting treatment. For such purpose, the substrates are preferably kept as dry as possible, which readily generates the static electricity in the dry substrates. When the static electricity is accumulated in the substrates, fine dusts are likely to deposit onto surfaces of the substrates. When the substrates having the dusts are laminated, there would be problems in writing or recording data. Therefore, when the accumulated static electricity is removed from the substrates, such problems are deleted. Providing the conveyer with the static electricity removing device effectively removes the static electricity from the substrates d1 and d2.

As to Injection Molding Machine

Figure 3:
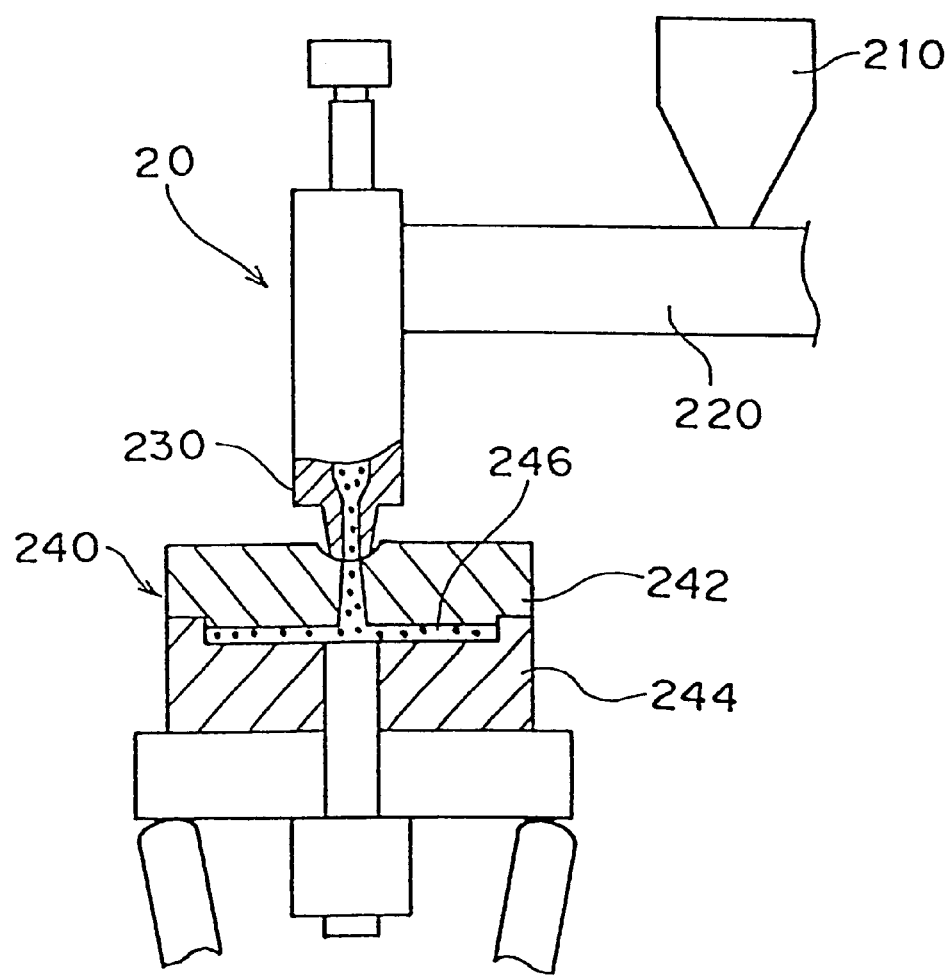
FIG. 3 shows a partially cross-sectional elevation view of the substrate forming unit.

A portion of an injection molding unit 20 is schematically shown in FIG. 3 in a partially cross-sectional view. Using this molding machine 20, the substrates d1 and d2 are produced by injection molding.

Resin in the form of tips (or pellets) stored in a hopper 210 is heated and kneaded in a screw cylinder 220 so that it is melted. The molten resin which is supplied to an injection cylinder 230 is injected into the mold 240.

The mold 240 is constituted by a pair of mold halves of an upper mold half 242 and a lower mold half 244, each of which has a heating means such as an electric heater (not shown) so that mold halves 242 and 244 are heated to predetermined temperatures respectively. Between the mold halves 242 and 244, there is defined a cavity 246 consisting of a disk shaped space which corresponds to the shape of the substrate d1 or d2.

As to Moisture Absorption and Warp Changes after Molding

Figure 4:
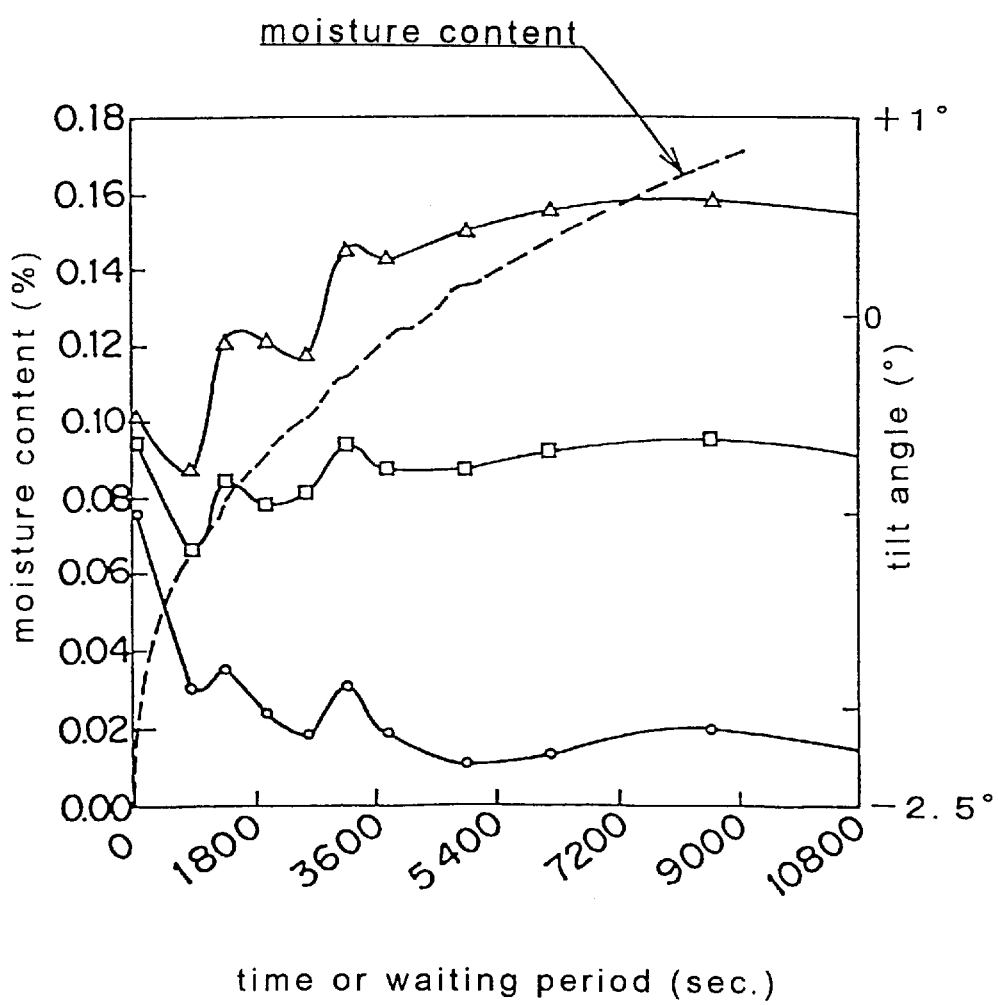
FIG. 4 is a graph which shows changes with time of a moisture content and tilt angles of a substrate after molding it.

The graph in FIG. 4 shows moisture content change with time of the substrates d1 and d2 (made of a polycarbonate) after they have been molded using the above described injection molding machine. Also, the graph shows tilt angle changes (i.e. warpage angle changes) of the produced optical disk with the waiting period of the waiting treatment between the molding and the thin film formation steps.

The substrates were molded of the polycarbonate at a mold temperature of 90° C. followed by being held in an atmosphere having a temperature of 23° C. and a relative humidity of 50%. In the graph, Δ indicates a tilt angle at a radial position of 58 mm from a center of the optical disk, □ indicates a tilt angle at a radial position of 40 mm from a center of the optical disk, and o indicates a tilt angle at a radial position of 23 mm from a center of the optical disk. The tilt angle was measured according to the DVD specifications while using a commercially available device for the optical measurement of the disk deformation. The moisture content was measured by weighing the change of the substrate.

As clearly seen from FIG. 4, the moisture content of the substrates d1 and d2 rapidly start to increase immediately after the molding, and continue to increase with time as shown in the broken line. Initially, the tilt angles widely change with large amplitudes, which lessen and smoothly change after about 4000 seconds (or 70 minutes) and approaches almost constant values.

In the annealing treatment of the prior art, the substrate is allowed to reach such a constant tilt angle, followed by the thin metal film formation, whereby the scattering of the tilt angle of the optical disk is suppressed.

According to the present invention, the moisture content of the substrates d1 and d2 is kept not greater than 0.1% by weight, and for such purpose, it is seen that the waiting period is preferably set in the range between about one minute and about 40 minutes (about 60 seconds and about 2400 seconds). Within such a range, the tilt angle itself is no so large. In a preferable embodiment of the present invention, the moisture content of the substrates d1 and d2 is kept not greater than 0.05% by weight, and for the achievement of such a moisture content, it is seen that the waiting period is preferably set in the range between about 2 minutes and about 6 minutes (about 120 seconds and about 360 seconds). In this case, the thin film formation is performed before the tilt angle changes with the large amplitude, so that the tilt angel scattering is suppressed.

As to Environmental Testing

Figure 5:
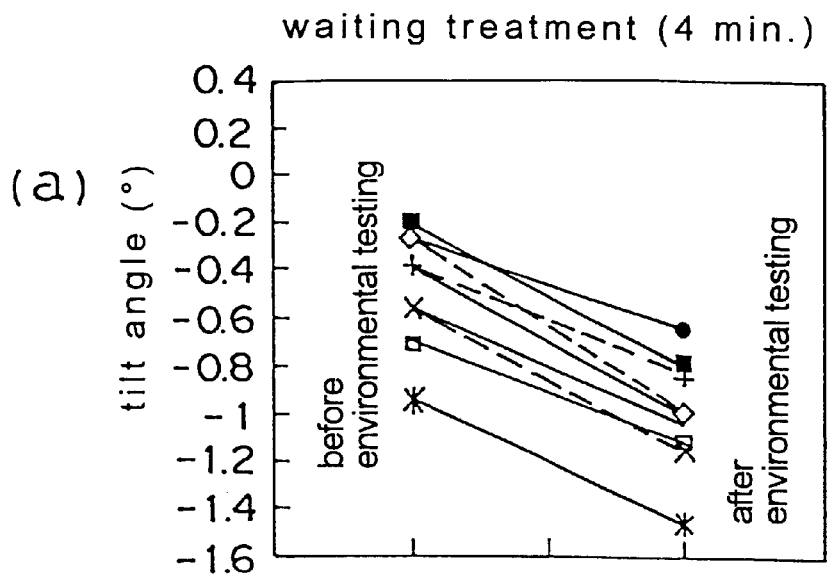
FIGS. 5(a) and 5(b) are graphs which show results of environmental tests of optical disks.
Figure 5:
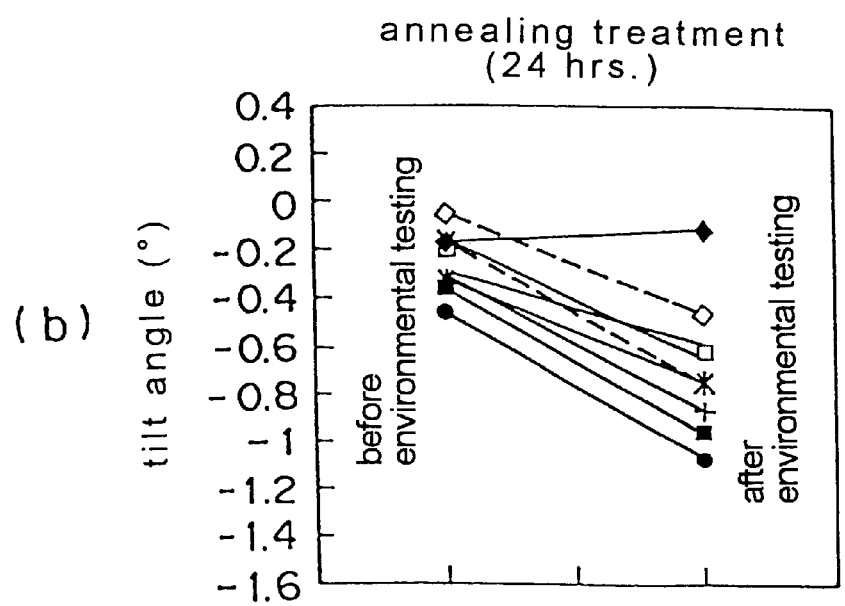

FIG. 5 shows estimation of environmental tests of the optical disks which were produced according to the present invention process (the waiting period: four minutes) and the optical disks produced by the prior art process in which 24 hour annealing treatment was carried out. Estimation of the tilt angle changes with a considerably long period after the production of the optical disks was made by means of accelerated environmental tests (at a temperature of 80° C. and a relative humidity of 85%, corresponding to four days). The optical disks were substantially the same as those used for the moisture content measurement as described above. The waiting treatment or the annealing treatment was carried out by holding the substrates in an atmosphere at temperature of 23° C. and a relative humidity of 50%. The substrates were at a temperature of 26° C. and their moisture contents were 0.04% by weight after the waiting treatment. The substrates were at a temperature of 23° C. and their moisture contents were 0.21% by weight after the annealing treatment.

FIG. 5(*a*) shows the tilt angles of the optical disks produced according to the present invention. The waiting period between the molding step and the thin film formation step was four minutes. The tilt angle measurement was carried out with respect to ten optical disks, and the difference in the tilt angle between before and after the environmental test was calculated and averaged to be Δt=−0.54°. FIG. 5(*b*) shows the tilt angles of the optical disks produced according to the 24 hour annealing treatment after the molding. The tilt angle measurement was carried out with respect to ten optical disks, and the difference in the tilt angle between before and after the environmental test was calculated and averaged to be Δt=−0.46°.

When compared the results of FIGS. 5(*a*) with those of 5(*b*), substantially no difference from a practical viewpoint was observed in the tilt angle change between the waiting treatment of the present invention and the annealing treatment of the prior art. However, considering the required periods for the treatments, the present invention requires the period of only less than 1/200 of that of the prior art, which means that the present invention provides much effective productivity.

As to Molding Temperature Adjustment

Effect of the molding temperature as to the warp of the produced optical disk was estimated when the mold temperature or the mold half temperature was changed in the molding step for the substrate in terms of the tilt angle change with time using the environmental testing as described above. The atmosphere of the waiting treatment included a temperature of 25° C. and a relative humidity of 38% and a waiting period was four minutes, and such waiting treatment provided the substrate of which temperature was 28° C. and moisture content of 0.04% by weight.

[Temperature Difference between Upper and Lower Mold Halves]

With the molding machine shown in FIG. 3, the temperature of the upper mold half 242 was different from that of the lower mold half 244 when the substrate d1 was molded. The waiting period between the molding step and the thin film formation step was 4 minutes.

Figure 6:
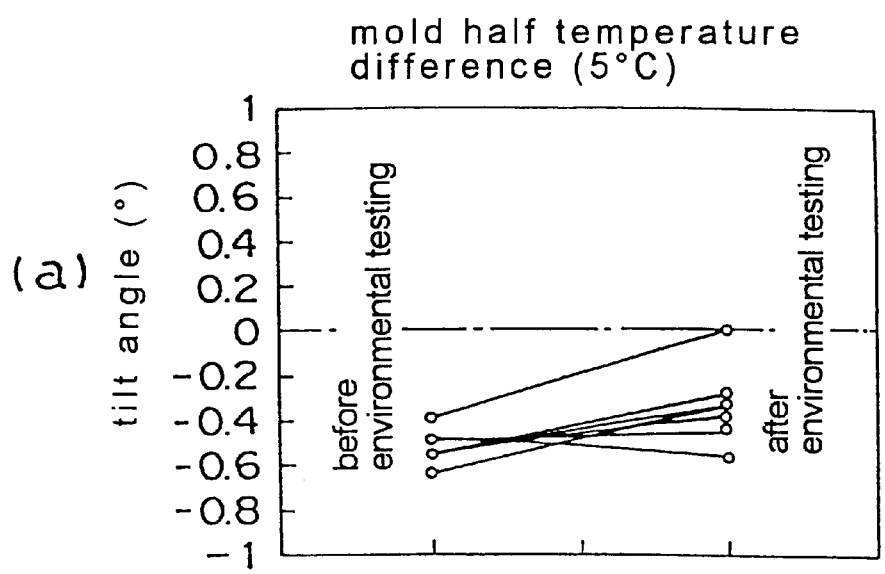
FIGS. 6(a) and 6(b) are graphs which show results of other environmental tests of optical disks.
Figure 6:
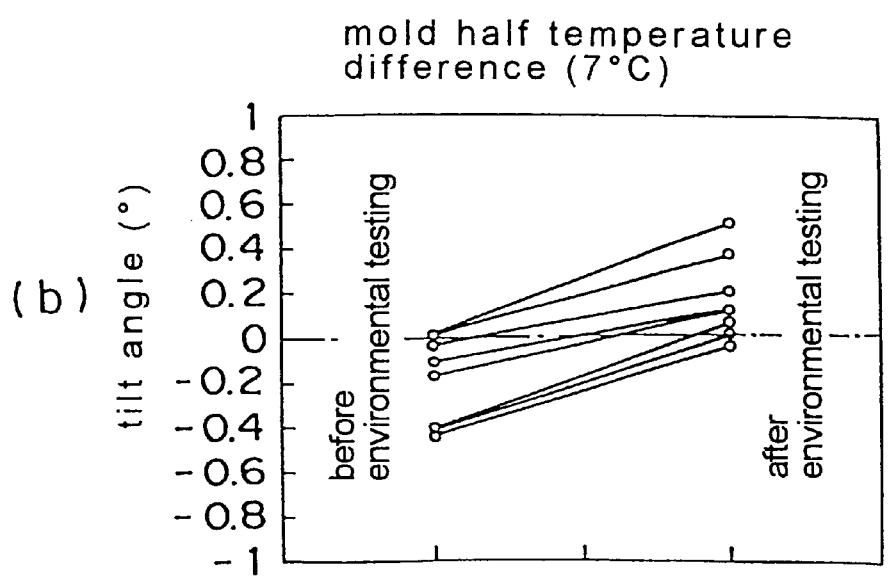

Fifteen samples were produced in Tests 1 and 2 respectively, and subjected to the environmental testing as described above. The results are shown in FIG. 6 and Table 1 below. In Table 1, Δt is an average of tilt angle changes between the tilt angles before and after the environmental testing. The substrates were made of the polycarbonate.

TABLE 1

|  | Test 1 | Test 2 |
| --- | --- | --- |
| Upper Mold Half Temp. (° C.) | 87 | 87 |
| Lower Mold Half Temp. (° C.) | 92 | 94 |
| Temp. Difference | 5 | 7 |
| Δt (°) | +0.19 | +0.44 |

Based on the results of the tests, when the mold half temperature difference is smaller as in Test 1 (FIG. 6(*a*)) is compared with the mold half temperature difference as in Test 2 (FIG. 6(*b*)) (which is usual temperature difference), the tilt angle before the environmental test is smaller in Test 2 in which the mold half temperature difference is larger than in Test 1.

The tilt angle change Δt between the tilt angles before and after the environmental test is smaller in Test 1 in which the mold half temperature difference is smaller than in Test 2. Comparing slopes of the straight lines in the graph of FIGS. 6(a) and 6(b), the slopes of Test 1 are less steep than those of Test 2. This means that making the mold half temperature difference smaller suppresses the tilt angle change with time.

Therefore, in order to lessen the warp deformation of the optical disk when it has been just produced, it is better that there is some mold half temperature difference, while in order to lessen the warp deformation of the optical disk with time, it is better that there is smaller mold half temperature difference (for example in the range between 2° C. and 5° C.). Generally, since it is preferable that the warpage deformation with time is less provided that upon the production, the optical disk satisfies the specifications as to the warpage deformation, the mold half temperature difference is preferably smaller (for example in the range between 2° C. and 5° C.).

[Temperature Difference between Molds for Substrates Produced by Different Molding Machines]

In the case where the pair of the substrates d1 and d2 are molded separately by the different molding machines 20 and 20', respectively, an effect of the difference in the mold temperature ΔT (=arithmetic mean of the upper mold half temperature and the lower mold half temperature of the mold) between the molding machines 20 and 20' on the warpage of the optical disk was estimated. It is noted that the substrate d1 had the semitransparent thin film (and having the rib from a shape viewpoint) and the substrate d2 had the non-transparent thin film (and having no rib from a shape viewpoint).

ΔT is calculated according to the following equation:

$$\Delta T = T1 - T2$$

wherein T1=(T11+T12)/2 and T2=(T21+T22)/2.

T1 is an arithmetic mean of the upper mold half temperature T11 and the lower mold half temperature T12 of the molding machine for the substrate d1, and T2 is an arithmetic mean of the upper mold half temperature T21 and the lower mold half temperature T22 of the molding machine for the substrate d2.

Figure 7:
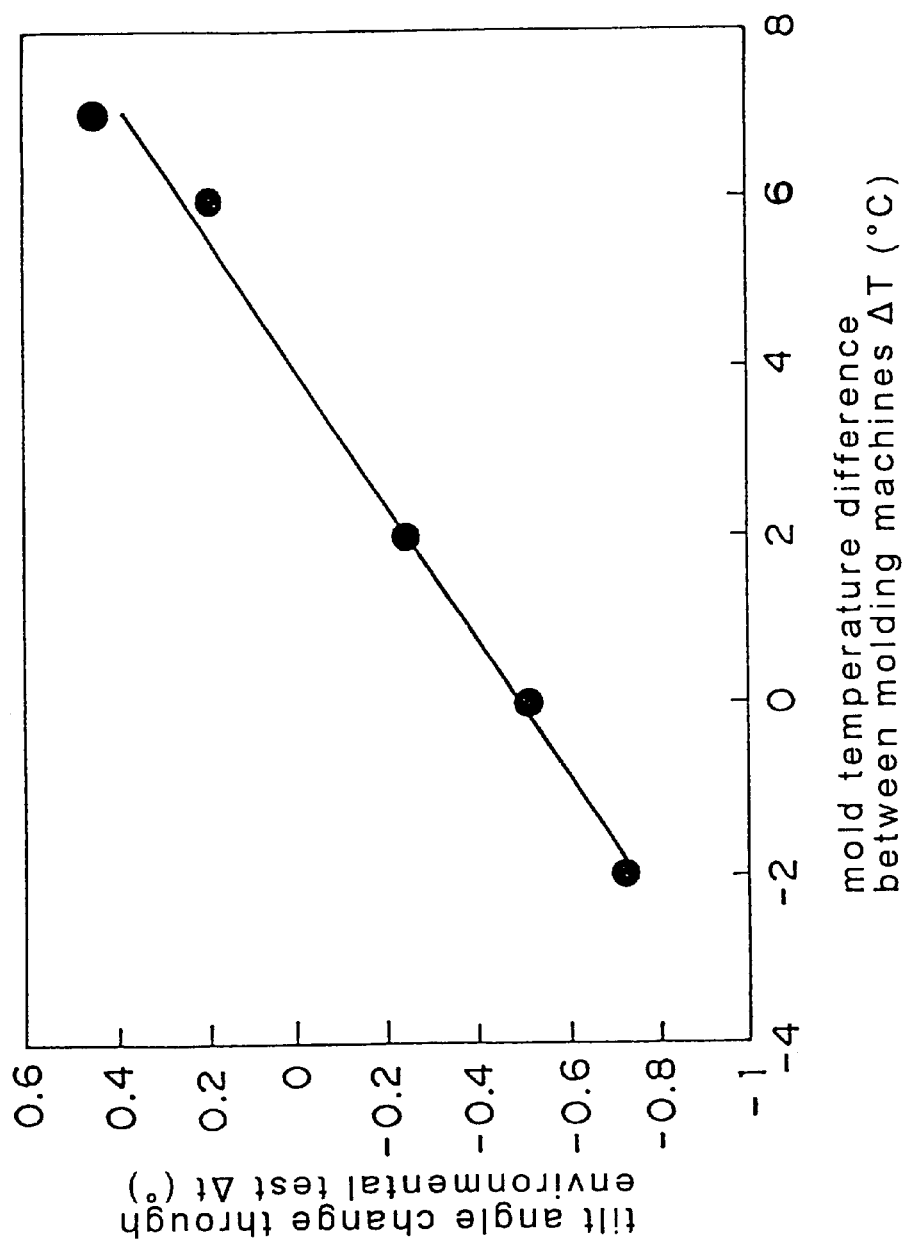
FIG. 7 is a graph which shows results of further environmental tests of optical disks.

The estimation was carried out by producing optical disks using the obtained substrates and performing the environmental testing as described above. The measured tilt angle changes are shown in FIG. 7 and Table 2. The temperature difference between the upper and lower mold halves was 6° C. The waiting treatment was carried out in the atmosphere having a temperature of 25° C. and a relative humidity of 38% and the waiting period was 4 minutes. By this treatment, the substrates were cooled to 28° C. and had a moisture content of 0.04% by weight.

TABLE 2

| Test | 1 | 2 | 3 | 4 | 5 |
|---|---|---|---|---|---|
| Mold Temp. of 1st Machine (° C.) | 87 | 89 | 91 | 89.5 | 90.5 |
| Mold Temp. of 2nd Machine (° C.) | 89 | 89 | 89 | 83.5 | 83.5 |
| Temp. Difference ΔT = T1 − T2 (° C.) | −2 | 0 | +2 | +6 | +7 |
| Tilt Angle Difference Δt (°) | −0.72 | −0.52 | −0.25 | +0.19 | +0.44 |

Based on the results as described above, the tilt angle difference Δt between before and after the environmental test depends on the mold temperature difference between the molding machines, and by properly setting the mold temperature difference (for example setting in the range between 2° C. and 6° C.), the warp deformation with time is lessened.

According to the process and the apparatus of producing the optical disk of the present invention, the warp deformation is effectively suppressed which deformation occurs because of processing conditions of the production process, especially those between the molding step and the thin film forming step, so that the optical disk having the improved flatness is produced and further the productivity of the optical disk production is also improved.

What is claimed is:

1. A process of producing a laminate type optical disk comprising the steps of:

(1) in a molding machine molding a pair of substrates of a transparent, polycarbonate resin at least one of which substrates has irregularities on its one main surface;

(2) forming a metal thin film on said one main surface having the irregularities, and then (3) laminating the pair of the substrates while the metal thin film is located inside and bonding the substrates by means of an adhesive which is supplied between the substrates, wherein after the step (1) and after removal of the substrates from the molding machine, a waiting treatment is carried out in which the molded substrates are cooled to such a temperature that a difference between said temperature and a temperature of an atmosphere surrounding the substrates is not greater than 5° C. while keeping a moisture content of the substrates not larger than 0.1% by weight, and then carrying out step (2).

2. The process according to claim 1 wherein a temperature of the atmosphere is in the range between 20° C. and 35° C., and a relative humidity of the atmosphere is in the range between 10% and 60%, and the waiting treatment is carried out for a period in the range between one minute and six minutes.

3. The process according to claim 1 or 2 wherein the waiting treatment is carried out while the moisture content of the substrate is kept not greater than 0.05% by weight.

* * * * *